United States Patent [19]

Koch

[11] Patent Number: 5,799,759

[45] Date of Patent: Sep. 1, 1998

[54] HYDRAULIC STRUT FOR A MOTOR VEHICLE

[75] Inventor: Klaus Koch, Dahlheim, Germany

[73] Assignee: Stabilus GmbH, Koblenz, Germany

[21] Appl. No.: 813,688

[22] Filed: Mar. 7, 1997

[30] Foreign Application Priority Data

Mar. 8, 1996 [DE] Germany ............ 196 09 040.7

[51] Int. Cl.⁶ .................................................. F16F 9/32
[52] U.S. Cl. ............... 188/300; 188/288; 188/322.19; 267/64.12; 267/120
[58] Field of Search .................... 267/120, 124, 267/64.12, 64.11; 188/300, 284, 282.1, 283, 288, 316, 317, 322.15, 322.22, 322.19, 322.18

[56] References Cited

U.S. PATENT DOCUMENTS

| 4,230,309 | 10/1980 | Schnitzius . |
| 4,595,182 | 6/1986 | Freitag et al. . |
| 5,450,933 | 9/1995 | Schüttler ............... 188/300 |
| 5,560,456 | 10/1996 | Koch et al. . |

FOREIGN PATENT DOCUMENTS

| 3301544 | 7/1984 | Germany . |
| 4326968 | 9/1994 | Germany . |
| 4431626 | 5/1995 | Germany . |

Primary Examiner—Douglas C. Butler
Attorney, Agent, or Firm—Nils H. Ljungman & Associates

[57] ABSTRACT

A positioning element to position two objects which are movable in relation to one another includes a cylinder in which there is an axially movable piston rod with a piston. The piston sealingly divides the cylinder into two working chambers by a piston ring, each of the working chambers containing blocking medium. The sealing by the piston ring can be bypassed during an insertion stroke of the piston rod. The piston includes a piston base body and a valve element, the valve element being movable along the base body to open and close a flow connection between the working chambers. An external opening force can displace the valve element to open the flow connection and permit an automatic extension stroke of the piston rod. The valve element remains open during the extension stroke on account of the flow of blocking medium through the flow connection. The valve element can be displaced to close the flow connection in response to stopping the extension stroke of the piston rod to position the two objects. To restart the extension stroke of the piston rod, a greater external opening force can be required than was necessary to start the initial extension stroke of the piston rod.

20 Claims, 7 Drawing Sheets

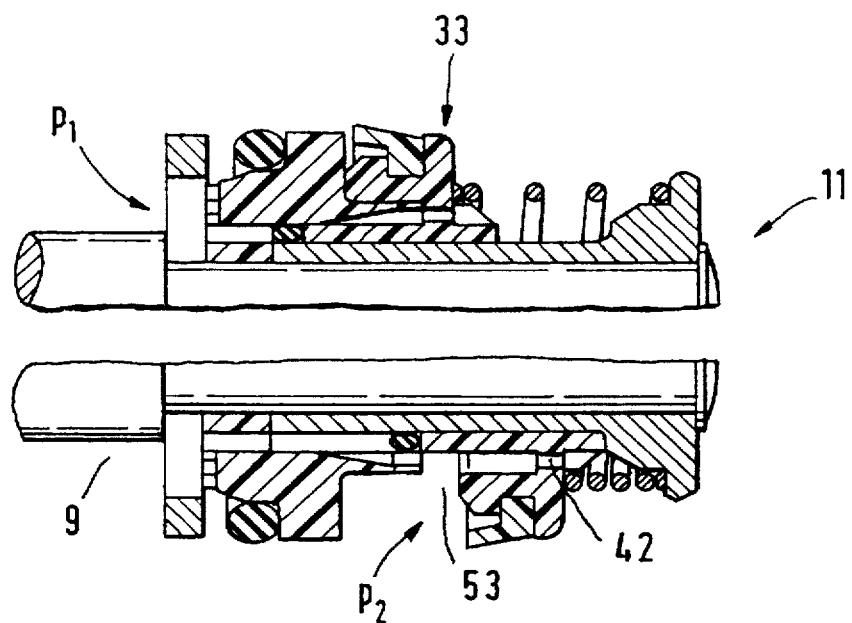
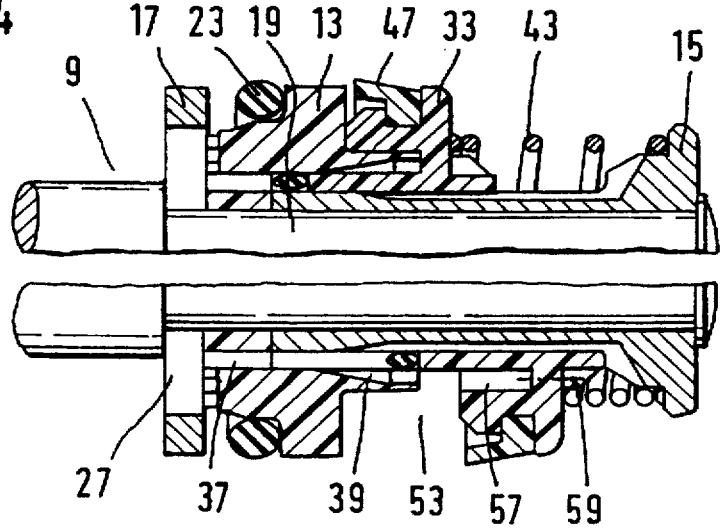

HYDRAULIC STRUT FOR A MOTOR VEHICLE

BACKGROUND OF THE INVENTION

1. Field of the Invention

The present invention relates generally to a positioning element, such as for a hydraulic or pneumatic strut for a motor vehicle, to position or lock in position two objects that are moveable with respect to one another. The positioning element can include a cylinder, in which cylinder there can be an axially movable piston rod with a piston. The piston can include a piston base body and can divide the cylinder into two working chambers by a piston ring. A valve element can be moveable relative to the piston base body, and, depending on the position to which the valve element has been switched, can connect the two working chambers to one another. The valve element can have a smaller pressurization surface in the closed position than in the open position of the valve element.

2. Background Information

German Patent No. 33 01 544 describes a gas shock absorbing strut which acts as a lifting mechanism for a vehicle tailgate or hatchback. The opening angle of the vehicle tailgate or hatchback is visibly divided for the user into two opening angle ranges. Beginning from the closed position of the vehicle tailgate or hatchback, the pneumatic spring extends automatically to the end of a first lifting angle range, and remains stationary in this position. The purpose of this measure, on vehicles which have a particularly heavy tailgate or hatchback, in particular a hatchback gate, is to make it easier for short users to reach the hatchback when it is open and to initiate the closing process. There can also be problems with low ceilings in garages.

The pneumatic spring, and thus the vehicle hatchback, therefore stop at the beginning of the second opening angle range. The first opening angle range is designed so that, on the basis of experience, there is reason to believe that a relatively large percentage of the population will be able to operate the hatchback satisfactorily. Particularly tall people, by applying additional continuous manual force, can take advantage of the second angular opening range, in which case it is necessary to overcome an overpressure valve in the pneumatic spring.

Basically, however, the principal objective of the person operating the hatchback or tailgate is to fix it in the desired position. On a product such as a motor vehicle which is sold internationally, there can be a significant difference in the height of the different groups of users. Therefore a rigid definition of the opening position can be considered a disadvantage.

An additional known positioning mechanism for a vehicle tailgate or hatchback is described in German Laid Open Patent Application No. 44 31 626, corresponding to U.S. Pat. No. 5,560,456. This positioning mechanism uses a valve element which has a smaller pressurization surface in the closed position than in the open position. The purpose of this measure is to make it necessary to apply a defined opening force, following which, however, only a small manual force is required for the rest of the extension movement. Simultaneously, a high blocking action can be set, because the opening push need only overcome the blocking action for a very brief period of time. This valve action, which in itself can be advantageous, has the disadvantage however that the valve element must be held in the open position, although it requires only a small external force, to achieve an extension movement of the positioning element. If the user stops applying the external force at any desired point, the tailgate or hatchback remains in the desired position. On this positioning mechanism, there is no strict division into a first and a second angular range of the opening.

OBJECT OF THE INVENTION

The object of the present invention is to realize a positioning element which allows an individual setting of the opening angle with a sufficiently high blocking force, without the need to apply an additional external force to assist the lifting movement.

SUMMARY OF THE INVENTION

The present invention teaches that this object can be accomplished in that:

- the sealing action of the piston ring in the extension direction can be neutralized by means of a bypass in a first lifting range,
- the pressurization surface of the valve element can be larger in the first portion of the stroke range than in the subsequent portion of the stroke,
- a dynamic pressure which acts in the opening direction of the valve element can hold the valve element in the open position until, as the result of the application of an external force, the extension movement of the piston rod is preferably stopped at a desired point, and a closing movement of the valve element can begin,
- starting from a holding position in the second portion of the stroke or range, the preferably smaller pressurization surface of the valve element, together with a second dynamic pressure, can effect an opening movement of the valve element and a bypass of the piston ring, and can initiate a movement of the piston rod,
- in the insertion direction, the sealing action of the piston ring can be neutralized, essentially regardless of the lifting position or position within the stroke.

One essential advantage of this positioning mechanism can be that when the positioning mechanism executes a lifting movement or extension stroke, the movement is preferably ended only when the maximum lifting range has been reached, or if the user applies a holding force at any desired point. The end of movement can allow the valve element to close. In possible embodiments of the present invention, there no longer needs to be a relatively strict separation into a first and a second portion of the stroke or range of the type known, or visible on the basis of any external criteria. To achieve a valve opening movement which is favorable from the point of view of the application of force or the force required, a particularly relatively large pressurization surface can be used in the first portion of the stroke, or the first portion of the lifting range. The user need only apply a relatively small amount of force, which force can be negligible compared to the force which must be applied for the opening or unlocking movement.

In other words, for a possible embodiment of the present invention, the user need apply a relatively small force to initiate a lifting movement or extension stroke of the positioning element. In effect, the force applied by the user can open a valve to allow flow of working fluid. The working fluid can then exert a substantially greater force on the piston to cause an extension stroke of the positioning element.

Basically, a relatively greater assistance force generally must be applied by the user precisely at the beginning of the lifting of a vehicle tailgate or hatchback, because the lever arm for the lifting force of the positioning mechanism can be still relatively small. So that the relatively greater support force supplied by the user is preferably not yet superimposed on a valve actuation force, it can be desirable to have the largest possible pressurization surfaces, because as compared to smaller pressurization surfaces, the larger pressurization surfaces can require a reduced dynamic pressure to cause a displacement of the valve element.

The present invention also teaches that the piston ring can be realized so that it can move axially in a ring groove, and, as a function of the direction of movement, can open or can close a bypass cross section preferably by means of friction actuation. The piston ring in connection with the ring groove, can, in a possible embodiment of the present invention, represent a relatively simple check or non-return valve, which non-return valve in the insertion direction can open up a relatively large bypass cross section, which can mean that the insertion movement can require relatively little force.

The present invention also teaches that the cylinder, in the first portion of the lifting range, can have a relatively larger interior cross section surface than in the second portion of the lifting range. The valve element can have a second piston ring which can be radially flexible and can compensate for the difference in diameter between the different portions of the lifting range, or lifting range of the stroke. The larger interior cross section, together with the second piston ring, can result in a relatively large pressurization surface, which can result in a relatively easy opening of the valve element.

The present invention also teaches that the sealing action of the second piston ring can be neutralized in the insertion direction. In practical terms, the second piston ring can be considered a check valve or non-return valve. The second piston ring thereby preferably has an elastic seal lip which, depending on the direction from which the flow enters, can expand radially or can spread. The actual check valve can be formed by the sealing lip or edge seal.

In the portion of the lifting range, the release force or triggering force or response force or actuating force for the valve element preferably must be greater than in the first portion of the lifting range, to prevent an inadvertent release. This effect can be achieved by providing the valve element with a preferably sleeve-shaped extension, the end surface of which sleeve-shaped extension can form the smaller pressurization surface. A gasket thereby can interact with the smaller pressurization surface, which gasket can close a ring channel of the piston base body. Consequently, for a possible embodiment of the present invention, there preferably is a relatively large difference in cross sections between the two pressurization surfaces.

Even when the valve element can be released in the second portion of the lifting range or stroke, a relatively greater force essentially must be applied only for a relatively short period of time, because the ring channel can have an expanded cross section. The cross section can preferably expand starting essentially from the closed position of the gasket of the valve element, so that the effective surface pressurized by the dynamic pressure can increase from the relatively small pressurization surface during an opening movement of the valve element, in the vicinity of the expanded cross section in the ring channel, up to an effective surface which can essentially equal the surface of the circular ring formed by the interior surface of the cylinder minus the cross section surface of the piston rod. The enlarged pressurization surface, together with the dynamic pressure, can then preferably hold the valve element in the opened position so that the adjustment or positioning element can preferably automatically continue its extension movement.

In one advantageous embodiment, the expanded cross section can be formed by angular grooves or diagonal grooves or oblique grooves. The angular grooves can result in a relatively slight pressure gradient which preferably begins at the ring channel, so that the flow velocity cannot result in an excessively rapid switching of the valve element which switching, experience has shown, can be accompanied by noise and vibrations. The expanded cross section can also be formed, in another possible embodiment of the present invention, by a substantially funnel-shaped expanded diameter.

The actual open position of the valve element can be achieved by providing the valve element with connecting openings, which connecting openings can make possible an overflow between the two working chambers. Such connecting openings, however, can also unfortunately be accompanied by relatively slight losses during the accumulation of a dynamic pressure for the larger pressurization surface. This effect can be reduced by having the valve element interact with a flow channel, whereby the flow channel, essentially regardless of the opening cross section of the ring channel, can make possible a connection between the two working chambers as a function of the valve position of the valve element. The action of the flow channel can be a function of the displacement travel of the valve element. A dynamic pressure can relatively rapidly build up to a relatively high level upstream of the valve element.

This dynamic pressure can very reliably open the valve element. Theoretically, with the connecting openings, it can be possible that the user, during a relatively extremely slow opening movement of the vehicle gate, may not be able to exert sufficient dynamic pressure upstream of the valve element, because essentially a pressure equalization between the two sides of the valve element can take place. The inclusion of a flow channel can essentially make this situation impossible.

So that the valve element can once again reliably assume its closed position, the valve element can have a ventilation opening to a dynamic pressure chamber. The dynamic pressure chamber can begin at the gasket in the ring chamber. During an opening movement of the vehicle hatchback or tailgate for a possible embodiment of the present invention, a dynamic pressure chamber can be formed between the piston base body and the valve element. This dynamic pressure chamber can be designed expressly for this direction of movement. But if the valve element is to be pushed back into its closed position, the previous action of the dynamic pressure chamber is no longer desirable, because the enclosed pressure could obstruct or prevent a complete closing movement of the valve element. A relatively small ventilation opening can provide for a pressure equalization and can allow the valve element to assume the specified position. On the other hand, the loss of dynamic pressure is preferably not so great that it would need to be taken into consideration.

For a valve element position which is defined essentially at all times, the valve element can be biased in the closing direction by a valve spring.

The valve element can also have locking means which, in the opening position of the valve element, can interact with matching locking means which can be fastened in a stationary manner relative to the piston rod. For this purpose the valve element can have an extension. The extension can represent or position the locking means, and can interact in a positive or interlocking manner with the matching locking means. The action of the locking means can thereby be reinforced by a spring which acts radially.

Alternatively, the valve element can interact non-positively with a retaining part which can be essentially stationary in relation to the piston rod. The forces acting on the valve element can be coordinated so that during an extension movement of the piston rod, the force of the current dynamic pressure on one of the two pressurization surfaces, in connection with the retaining force of the locking connection, is preferably greater than the closing force of the valve spring.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to the embodiments which are illustrated in the accompanying figures, in which:

FIGS. 3 and 4 show the piston as an individual part;

DESCRIPTION OF THE PREFERRED EMBODIMENT

Figure 1:
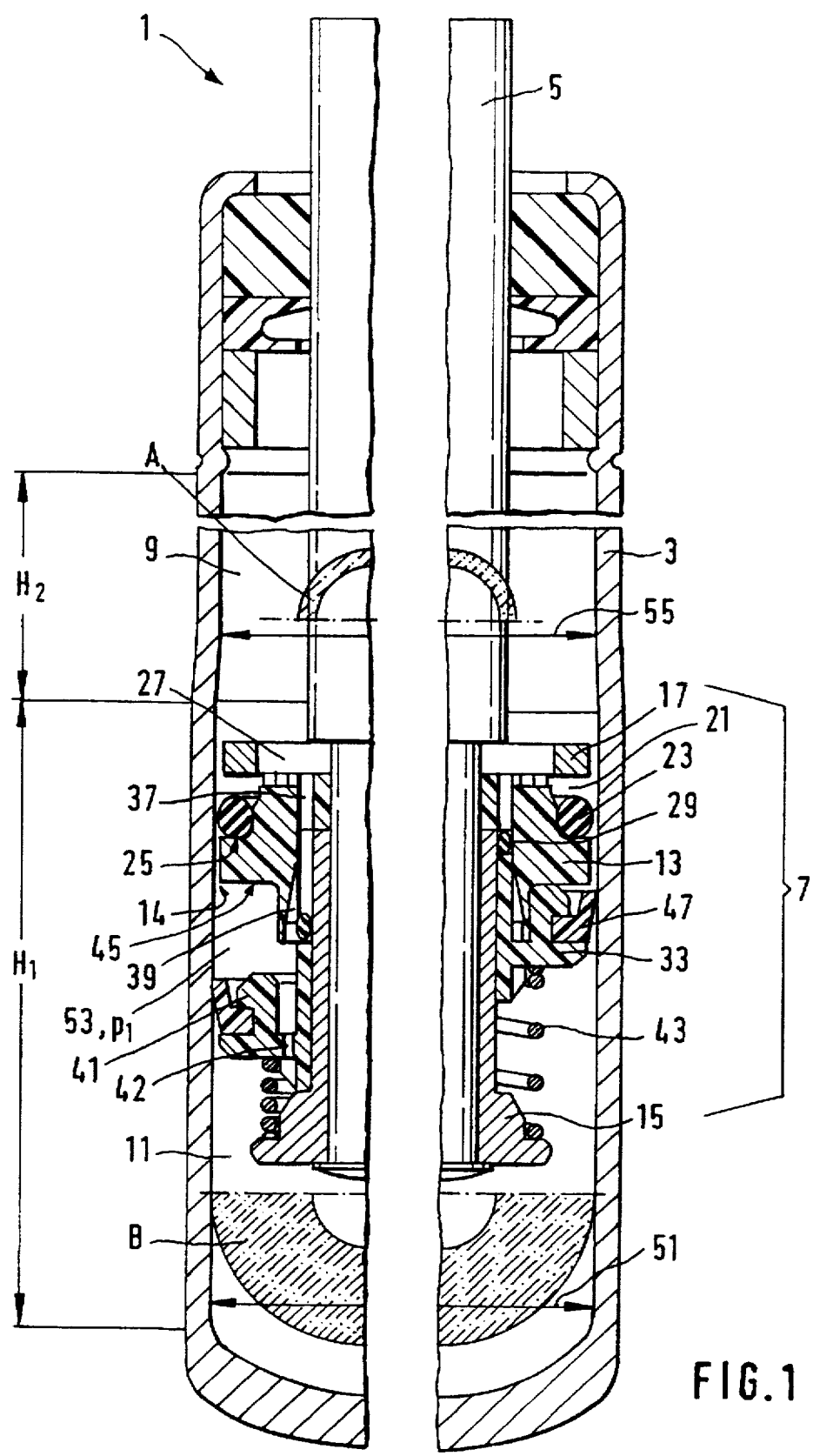
FIGS. 1 and 2 show positioning mechanisms in cross section.

FIG. 1 shows a positioning element 1 for the positioning of two objects which can move relative to one another, for example for use on a vehicle door or a vehicle tailgate or hatchback. Of course, other applications are conceivable, but the details indicated below relate only to the embodiments illustrated in the accompanying figures.

The positioning element can include a cylinder 3. In the cylinder 3 can be a piston rod 5 with a piston 7. The piston rod 5 can be guided so that the piston rod 5, can move axially. The piston 7 can divide the cylinder 3 into an upper working chamber 9, which upper working chamber 9 preferably is closer to the piston rod 5, and a lower working chamber 11, which lower working chamber 11 preferably is farther from the piston rod 5. A piston base body 13 can represent a basic component of the piston 7. The piston base body 13 can be located between a guide sleeve 15 and a stop plate 17, and can therefore be a component of a series braced or clamped on a stud or pin or tenon or extension 19 (shown in FIG. 2) of the piston rod 5.

In other words, and in accordance with one embodiment, the positioning element 1 can include the cylinder 3, in which cylinder 3 the piston 7 can slide along the longitudinal axis of the cylinder 3. The piston 7 can divide the cylinder 3 into two chambers, the first, or upper working chamber 9 and the second, or lower working chamber 11. The piston rod 5 can extend into the upper working chamber 9, and the piston rod 5 can be attached to the side of the piston 7 facing the upper working chamber 9. The end of the piston rod 5 not located in the cylinder 3 can be connected to a first object (not shown), and the cylinder 3 can be connected to a second object (not shown). The positioning element 1 can permit relative positioning of the first object with respect to the second object, preferably via insertion and extraction of the piston rod 5 with respect to the cylinder 3, that is, by movement of the piston 7 along the longitudinal axis of the cylinder 3.

In a possible embodiment of the present invention, the first object can be a hinged component of a motor vehicle, such as a vehicle tailgate or liftgate or hatchback or hood or trunk, and the second object can be the vehicle body, to permit positioning of the hinged component with respect to the vehicle body.

The piston base body 13 and the stop plate 17 can form a ring groove 21, in which ring groove 21 there can be a piston ring 23. In the direction of the stop plate 17, the ring groove 21 can be conical, so that the piston ring 23 preferably has a tendency to assume the smaller diameter of the ring groove 23. Depending on the operating condition, the piston ring 23 can make contact with the stop plate 17 or a shoulder 25 of the piston base body 13. When the piston ring 23 is in contact with the stop plate 17, a blocking medium inside the cylinder 3 can flow around the piston base body 13 by means of a bypass 14. The blocking medium can be a gas under pressure. Alternatively, for an alternative embodiment of the present invention, a hydraulic medium can be used for the same purpose.

In other words, in accordance with one embodiment, both the upper working chamber 9 and the lower working chamber 11 can contain blocking medium or operating fluid or working fluid such as, for possible embodiments of the present invention, a pressurized gas or a hydraulic fluid. The piston 7 can sealingly divide the upper working chamber 9 from the lower working chamber 11. Because the cross-sectional area of the piston rod 5 can reduce the net effective area of the side of the piston 7 exposed to the blocking medium contained in the upper working chamber 9, the net effective area of that side of the piston 7 adjacent the upper working chamber 9 can preferably be less than the net effective area of the piston 7 exposed to the blocking medium contained in the lower working chamber 11. Therefore, if the pressure of the operating fluid within each of the upper and lower working chambers 9 and 11 are substantially equal, a net axial force can be generated against the piston 7 to displace the piston 7 towards the upper working chamber 9, extending the piston rod 5.

On the radial inside, the piston base body 13 can have bypasses 27. These bypasses 27 can be opened or closed as a function of the position of a gasket 29. The operating pressure in the working chamber 9 can essentially ensure that the gasket 29 can preferably always be in contact with an end surface 31 (see FIG. 2) of an axially movable valve element 33. The end surface 31 can represent the terminal surface of a sleeve-shaped extension 35 (see FIG. 2), which sleeve-shaped extension 35 can also perform a guidance function for the valve element 33. The sleeve-shaped extension 35 can be engaged in a ring channel 37, which ring channel 37 can form an extension of the bypass 27. The ring channel 37 can, for possible embodiments of the present invention, have either angular grooves or a funnel-shaped enlarged diameter as an enlarged cross section 39.

In other words, the ring channel 37 can, for possible embodiments of the present invention, have either angular grooves disposed at an oblique angle with respect to the stroke of the positioning element 1, or the ring channel 37 can include a conical-shaped portion to form the enlarged cross section 39.

Outside the enlarged cross section 39, the valve element 33 can be realized in the form of a disc with a stop ring 41. This stop ring 41 can be biased by a valve spring 43 towards an overlapping surface 45 of the piston base body 13 (see the right half of the figures in FIGS. 1 and 2). The height of the stop ring 41 in relation to the sleeve-shaped extension 35 can be sized so that the gasket 29, on account of the pressure conditions on the gasket 29, can essentially always be in the vicinity of the ring channel 37. The bypasses 27, which bypasses 27 in one possible embodiment of the present invention can be realized in the form of borings, are preferably not directly covered, but only the ring channel 37 itself. Consequently, there can be a certain space or distance between the outlet of the bypasses 27 and the gasket 29, which space, in connection with the blocking medium, can result in a circular ring-shaped pressurization surface A, which is indicated by hatch marks.

Located on the stop ring 41 can be a second piston ring 47, preferably realized as a snap ring, which piston ring 47 can be realized with a radially movable elastic sealing lip 49. This sealing lip 49 can preferably compensate for changes in diameter in the cylinder 3, and the sealing lip 49 can preferably also neutralize its sealing action in the event of a pressurization from the working chamber 11 which is farther from the piston rod 5.

In addition, at least one connecting opening 42 can be machined or otherwise introduced into the stop ring 41. This connecting opening 42 can make possible an overflow of blocking medium when the valve element 33 has reached a certain distance from the piston base body 13.

In other words, the connecting opening 42 can form a portion of a flow path permitting flow of blocking medium between the upper working chamber 9 and the lower working chamber 11 when the valve element 33 has moved a sufficient distance from the piston base body 13.

FIG. 1 shows the positioning element 1 when the piston 5 is in the vicinity of an enlarged interior cross section surface 51. This interior cross section surface 51 can be limited to a portion $H_1$ of the stroke in the cylinder 3. The actual increase in the interior cross section can be accomplished by the introduction of grooves, but can also be accomplished by adding an encircling expanded diameter.

In other words, in accordance with one embodiment, the cylinder 3 can be divided into two axial portions,. a first axial portion corresponding to the stroke portion $H_1$ and a second axial portion corresponding to the stroke portion $H_2$. The cylinder 3, along its axial portion corresponding to the stroke portion $H_1$, can have an interior chamber having a first cross section area. The first cross section area can be represented by the cross section dimension 51. The cylinder 3, along its axial portion corresponding to the stroke portion $H_2$, can have an interior chamber having a second cross section area. The second cross section can be represented by the cross section dimension 55. The first cross section area 51 can be greater than the second cross section area 55. The increased cross section area of the first cross section area 51 as compared to the second cross section area 55 can be accomplished, in possible embodiments of the present invention, by enlarging the internal diameter 51 of the cylinder 3 in the first stroke portion $H_1$ as compared to the internal diameter 55 of the second stroke portion $H_2$ of the cylinder 3. Alternatively, axial grooves can be formed along the interior wall in the first axial portion of the cylinder 3.

It can be assumed that when the vehicle tailgate is closed, the piston rod 5 and the piston 7 are preferably inserted relatively far into the cylinder 3, and that the second piston ring 47 can be in the vicinity of the enlarged interior cross section 51 of the cylinder 3. During an opening movement or an extension movement of the piston rod 5, blocking medium can be displaced via the bypass 27 into the ring channel 37, as a result of which displacement the gasket 29 with a pressurization surface A can preferably exert a first axial force of or on the valve element 33. Substantially simultaneously, the piston ring 23 can be in contact with the stop plate 17. The blocking medium can flow outside along the stop plate 17, past the piston ring 23 and into the bypass 14 produced by the interior cross section surface of the cylinder 3. From the working chamber 9, which working chamber 9 can be closer to the piston rod 5, blocking medium can flow into the bypass 14. The additional flow into the lower working chamber 11 can initially be prevented by the second piston ring 47. Upstream of the valve element 33, a dynamic pressure $p_1$ can be formed, which dynamic pressure $p_1$ can allow the valve element 33 to lift up from or move away from the overlapping surface 45 of the piston base body 13. Then the pressurized surface on the valve element 33 is preferably enlarged to the hatch-marked surface B in the working chamber 11. Between the valve element 33, which valve element 33 can move in a sliding manner along the guide sleeve 15 against the force of the valve spring 43 and the piston base body 13, a dynamic pressure chamber 53 can be formed. The blocking medium can then travel to the end of the first portion $H_1$ of the stroke, out of the upper working chamber 9, through the bypass 14 and the ring channel 37 into the dynamic pressure chamber 53, and from there through the connecting openings 42 in the valve element 33 into the lower working chamber 11. When the blocking medium is a gas or a hydraulic medium with spring bias, the piston rod 5 can be essentially automatically extended.

In other words, to essentially automatically extend the piston rod 5 upon opening the vehicle tailgate, the valve element 33 can open in response to the user applying an external force to open the vehicle tailgate. The valve element 33 can be considered a first valve that can open and close fluid communication between the upper working chamber 9 and the lower working chamber 11. When the first valve, that is, valve element 33 is open, the upper and lower working chambers 9 and 11 can be in fluid communication via the connection openings 42 with one another, thereby preferably substantially equalizing the working pressures of the upper and lower working chambers 9 and 11 with one another. As a result of the pressure equalization, a net force can act on the piston 7, which net force can act to drive the piston 7 towards the upper working chamber 9.

When the vehicle tailgate is closed, the valve element 33 can be assumed to be in its closed position (shown on the left hand side of FIG. 1). To open the valve element 33, the user can apply an external opening force to open the vehicle tailgate. The external opening force applied by the user to open the vehicle tailgate preferably attempts to move the piston 7 upwards (as seen in FIG. 1), thereby attempting to compress the operating fluid or blocking medium contained within the upper working chamber 9. The internal pressure within the upper working chamber 9 can increase as the blocking medium within the upper working chamber 9 is compressed and becomes a pressurized blocking medium. The actuation force applied by the user can be transferred by the pressurized blocking medium to the valve element 33 to exert a downward actuation force on the valve element 33.

The downward actuation force acting on the valve element 33 can trigger or actuate the valve element 33 to begin downward movement along the guide sleeve 15 of the piston 7 to move from the closed position of the valve element 33.

Figure 8:
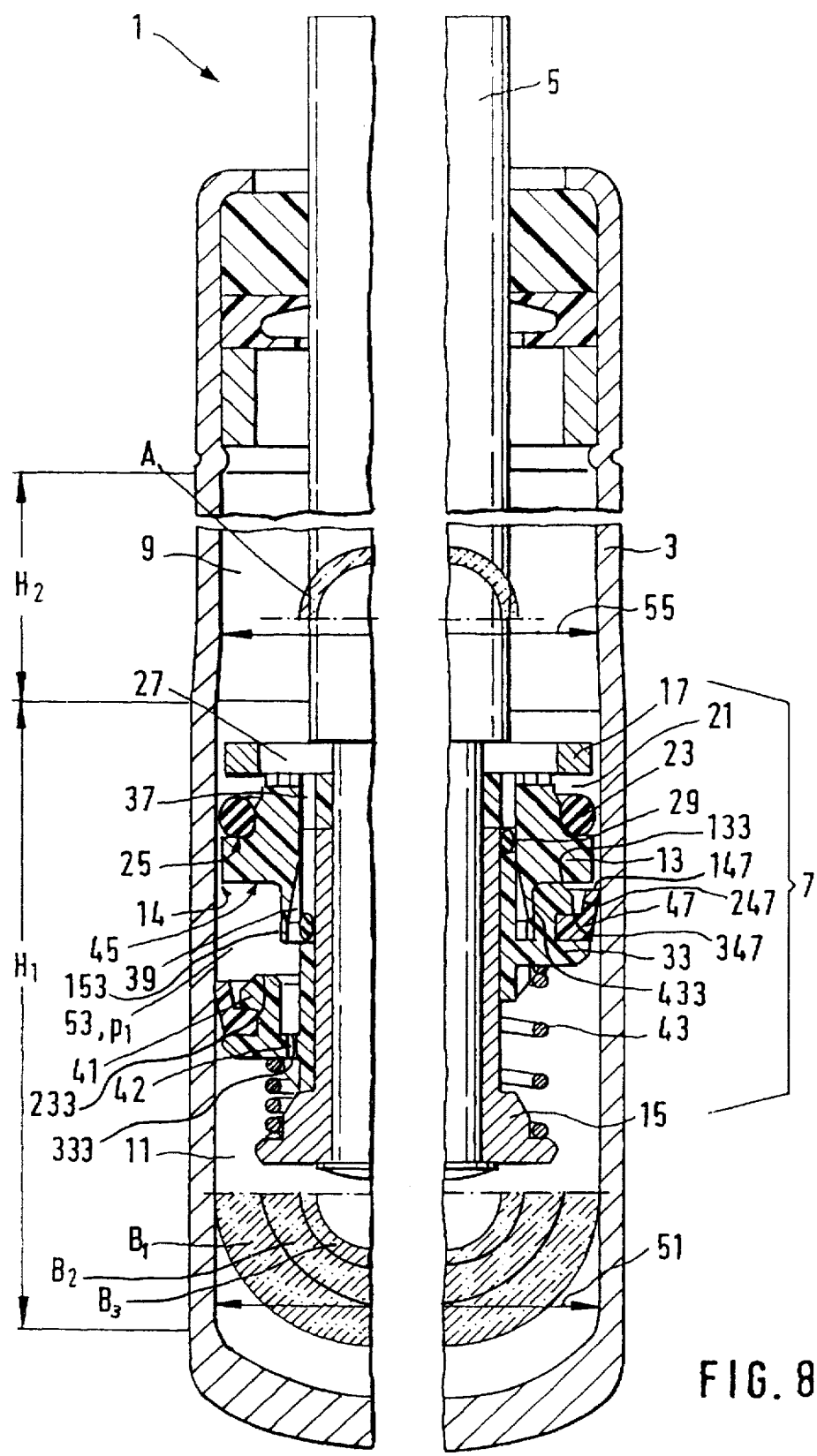
FIG. 8 shows a positioning mechanism in cross section.

The transfer of the actuating force from the user to the valve element 33 to actuate or trigger the opening movement of valve element 33 can be as follows. As shown in FIG. 8, for a possible embodiment of the present invention, the increase in internal pressure of the blocking medium contained within the upper working chamber 9 caused by the application of an actuation force by the user can act on various component surfaces of the positioning element 1. The gasket 29 can be pressed by the pressurized blocking medium via ring channel 37 against an end surface 31 of the valve element 33. The effective cross section area or actuating surface or pressurizing surface of the gasket 29 or the end surface 31 indirectly exposed to the increased pressure can be represented by the annular area $B_3$ shown in FIG. 8 (the annular area $B_3$ corresponds to the pressurizing area A shown in FIG. 1). A first downward force thereby acts on valve element 33 via the end surface 31.

Preferably acting simultaneously with the first downward force generated by actuating surface $B_3$, a second downward force can act on the valve element 33. The second downward force can be caused by the pressurized blocking medium acting against an additional or second cross section area or actuating surface or pressurizing surface $B_1$ as shown in FIG. 8. The increased pressure can be communicated to the pressurizing surface $B_1$ via the flow bypass 14. The second downward force generated by the surface $B_1$ can act substantially in parallel with the first downward force generated by the surface represented by $B_3$. The additional cross section area $B_1$ can be formed from portions of the lip seal 47 and the valve element 33. As shown in FIG. 8, an end surface 147, a wall surface 247 and an annular portion 347 of the lip seal 47 can be exposed to the increased pressure via the bypass 14. Additionally, an exposed surface 133 of the valve element 33 can also be exposed to the increased pressure via the bypass 14. The effective cross section areas or actuating surfaces of these surfaces 147, 247, 347 and 133 can be represented by the annular portion $B_1$ and can transfer the second downward force generated by actuation surface $B_1$ to the valve element 33.

In other words, in the embodiment shown in FIG. 8, to begin an opening extension of the positioning element 1 from its initial closed or fully retracted position shown in the right portion of FIG. 8, the user can apply an external opening force or external actuating force to begin the extension of the piston rod 5 from the cylinder 3. The internal pressure of the blocking medium within the upper working chamber 9 therefore increases, and the pressurized blocking medium within the upper working chamber 9 can transfer a downward force on valve element 33. The downward force acting on valve element 33 to actuate valve element 33 from its closed position (shown on the right hand side of FIG. 8) to its open position (shown on the left hand side of FIG. 8) can force the valve element 33 to begin moving downward along the guide sleeve 15. The downward force acting on valve element 33 to actuate valve element 33 can be generated by the sum of two downward forces, a first downward force generated by the interaction of the pressurized blocking medium with the pressurizing surface $B_3$ via ring channel 37 and end surface 31 of valve element 33, and a second downward force generated by the interaction of the pressurized blocking medium with the second pressurizing surface $B_1$ via flow connection 14 and surfaces 147, 247, 347 and 133.

The actuating force applied to the valve element 33 by the interaction of pressurized blocking medium contained in the upper working chamber 9 with pressurizing areas $B_1$ and $B_3$ can cause the valve element 33 to begin downward movement along the guide sleeve 15 of the piston 7. When the valve element 33 is in its closed position, a surface 233 of the valve element 33 can contact the surface 45 of the piston base body 13. As the valve element 33 begins downward displacement along the guide sleeve 15, a gap 153 can be formed between the surface 233 and the surface 45. The gap 153 can form a portion of the dynamic pressure chamber 53 preferably created when the valve element 33 separates from the piston base body 13. The pressurized blocking medium can now communicate via the bypass 14 and the dynamic pressure chamber 53 to pressurize the surface 233 of the valve element 33 to apply additional downward actuation force to the valve element 33.

In the initial or beginning portion of downward movement of the valve element 33, the sleeve shaped extension 35 of the valve element 33 can remain engaged within the ring channel 37, and the extension 35 can prevent flow of blocking medium between the ring channel 37 and the connecting opening 42. In addition, a surface 433 of the valve element 33 can remain in contact with the piston base body 13 to prevent fluid communication between the dynamic chamber 53 and a surface 333 containing the connecting opening 42 of the valve element 33. Therefore, during a first portion of downward travel of the valve element 33, the upper working chamber 9 can remain effectively sealed from the lower working chamber 11.

Once the valve element 33 has moved downward the first portion of its downward travel, the gasket 29 can move adjacent the enlarged cross section 39 of the ring channel 37, and the surface 433 of the valve element 33 can move out of contact with the piston base body 13. Thereupon the dynamic pressure chamber 53 can be placed in fluid communication with the surface 333 of valve element 33. At this point the surfaces 31 (represented by the area $B_1$), surfaces 147, 247, 347 and 133 (represented by the area $B_3$) and surfaces 233 and 333, having a net cross section area or pressurizing area represented by the area $B_2$ of FIG. 8, can be in fluid communication with the upper working chamber 9. The sum of the cross section areas $B_1$, $B_2$ and $B_3$ as shown in FIG. 8 can correspond to pressurizing area B shown in FIG. 1.

Because the gasket 29 has moved adjacent the enlarged cross section 39 of the ring channel 37, a flow connection can be created between the upper working chamber 9 and the lower working chamber 11. This flow connection can include the bypass 14 and the bypasses 27 fluidly connecting the dynamic pressure chamber 53 with the upper working chamber 9, and the connecting opening 42 fluidly connecting the dynamic chamber 53 with the lower working chamber 11.

The valve element 33 can be considered to have reached its lower or open position, allowing fluid communication between the upper working chamber 9 and the lower working chamber 11. Positioning the valve element 33 in the open position of valve element 33 can substantially equalize the operating pressures of the upper working chamber 9 and the lower working chamber 11, in effect depressurizing the pressurized blocking medium contained in the upper working chamber 9. Hence, the net downward force acting on the valve element 33 generated by the pressurized blocking medium can end. However, as a result of the equalization in pressure, a net upward force can now act on the piston 7 to begin extending the piston rod 5 without need of further user assistance.

To keep the first valve, i.e. valve element 33, open while the piston rod 5 is extending, the flow of blocking medium from the upper working chamber 9 to the lower working chamber 11 can be utilized to maintain the valve element 33 in the open position. While the piston rod 5 is extending, the upper working chamber 9 can be decreasing in volume, and the lower working chamber 11 can be increasing in volume. Therefore blocking medium will flow from the upper working chamber 9 to the lower working chamber 11. Blocking medium can flow into the dynamic pressure chamber 53 between the upper and lower working chambers 9 and 11, via bypass 14 and ring channel 37. The pressure chamber 53 can be formed by the opening of the valve element 33. The blocking medium flowing through the pressure chamber 53 can essentially strike or impinge on portions of the valve element 33 and of the lip seal 47. For the embodiment shown in FIG. 8, the flow of blocking medium can in effect strike or impinge or engage against surfaces 31 (via gasket 29), 133 (formed as a chamfer of the valve element 33 in the embodiment shown in FIG. 8), 233 and 433 of valve element 33 and surfaces 147, 247 and 347 of lip seal 47. The impingement of blocking medium flow on the valve element 33 and lip seal 47 can therefore act on the cross sectional areas $B_1$, $B_2$ and $B_3$ of FIG. 8, that is, to a cross sectional area corresponding to the pressurizing area B shown in FIG. 1.

The impingement or engagement of flowing blocking medium on the area B can exert a downward force on the valve element 33, the downward force preventing the valve element 33 from closing and maintaining the valve element 33 in the open position. The extending of the piston rod 5, by creating blocking medium flow that can impinge on the surface area represented by the cross section area B, can prevent the valve element 33 from closing, and can allow continued extending of the piston rod 5 without further user assistance.

In contrast to the portion $H_1$ of the stroke, which portion $H_1$ can have an enlarged interior cross section surface or enlarged interior cross section 51, in the portion $H_2$ of the stroke there preferably is only an interior cross section 55. The interior cross section 55 can essentially equal the nominal dimension of the cylinder 3. Below or beyond the portion $H_2$ of the stroke, the piston ring 23 can come into frictional contact with the interior surface of the cylinder 3 (see FIG. 2). The frictional contact can move the piston ring 23 out of the vicinity of the conical groove base of the base body 13 toward the shoulder 25, as a result of which movement the bypass 14 is preferably closed. The extension movement of the piston rod 5 can then continue without any externally visible changes.

If an opening angle is reached at which the vehicle tailgate is to be held and fixed in position, all the user preferably has to do is to briefly stop the extension movement of the piston rod 5. The retaining force introduced from outside can cause an equalization of the pressure between the dynamic pressure chamber 53 and the lower working chamber 11. The dynamic pressure $p_1$, which dynamic pressure $p_1$ has been active up to this point, can be reduced, so that the valve spring 43 can displace the valve element 33 toward the piston base body 13. Essentially as soon as the gasket 29 has been pushed into the ring channel 37, no blocking medium can flow along this path into the dynamic pressure chamber 53, and from there into the lower working chamber 11. The positioning element 1 can be substantially locked in place.

In other words, by briefly stopping the extension movement of the piston rod 5, the blocking medium no longer flows between the upper and lower working chambers 9 and 11. Therefore, the flow of blocking medium no longer impinges on the cross section area B, and the downward force acting on the valve element 33 from the flow of blocking medium can be eliminated. The valve element 33 can then return to its closed position by the urging of the valve spring 43. The first valve, i.e. valve element 33 can thereby close and fluid communication between the upper and lower working chambers can be halted. The piston 7 can thereby assume a stationary equilibrium position, maintaining a relative positioning of a first object with respect to a second object.

The valve element 33 can also close if the extension of the piston rod 5 reaches the maximum position and no further extension movement of the piston rod 5 can occur because of mechanical interference.

For a continuation of the extension movement, the user essentially must apply an external force to generate a dynamic pressure $p_2$ (see FIG. 2) which in turn can act through the bypass 27 on the pressurized surface A of the gasket 29. In the portion $H_2$ of the stroke, on account of the relatively smaller pressurized surface A compared to the pressurized surface B, a relatively greater manual force can be necessary in the portion $H_1$ of the stroke. This measure was implemented deliberately for the embodiment shown in FIGS. 1 and 2, so that a further opening movement could essentially not be performed carelessly or negligently, on account of the damage which could be caused to the vehicle gate if it encountered an obstacle.

Figure 2:
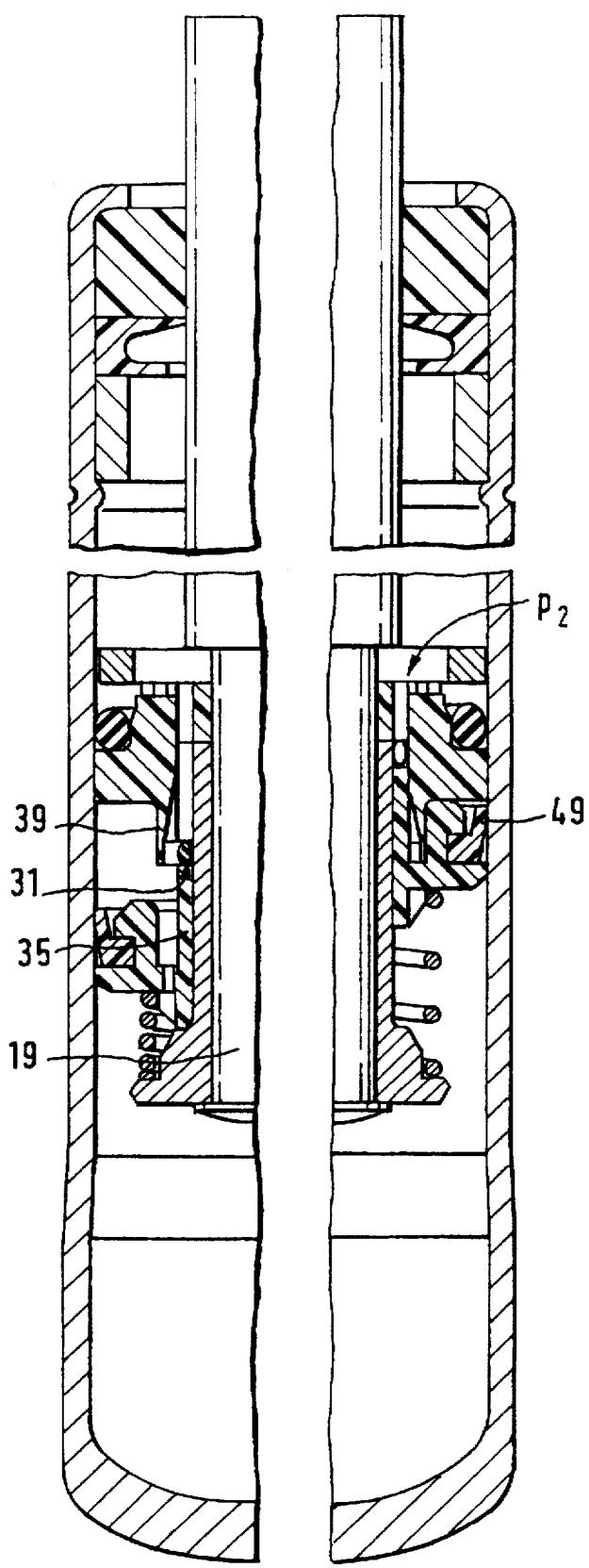

In other words, beyond an opening extension range $H_1$, the gasket 29 can contact the reduced cylinder diameter represented by 55 to seal or close the bypass 14 (see FIG. 2). If the extension movement of the piston rod 5 is stopped with the gasket 29 against the reduced diameter 55, the valve element 33 can return to its closed position as described above. However, to reinitiate or restart extension of the piston rod 5 with the gasket 29 located within the second stroke portion $H_2$, the user preferably must apply a greater actuation force than was necessary when the gasket 29 was located within the first portion $H_1$. This feature of the present invention preferably can make it less likely that an unintentional force applied to the positioning element 1 can reinitiate an extension stroke of the positioning element 1.

To reinitiate an opening extension of the positioning element 1 when the gasket 29 has become stationary within the second stroke portion $H_2$ (as shown in FIG. 2), the user can again apply an external opening force or external actuating force to reinitiate the extension of the piston rod 5 from the cylinder 3. The internal pressure of the blocking medium within the upper working chamber 9 therefore can again increase to generate pressurized blocking medium, and the pressurized blocking medium within the upper working chamber 9 can again transfer a downward force on valve element 33. The pressurized blocking medium can interact, via ring channel 37 and gasket 29, to again apply a downward force on the surface 31 of valve element 33 to actuate the valve element 33 and begin downward movement of valve element 33 to an open position. However, because the bypass 14 is now closed, the pressurized blocking medium cannot interact with surfaces 147, 247 and 347 of the lip seal 47 nor with surface 133 of the valve element 33 (that is, the pressurized blocking medium cannot be in fluid communication with those surfaces represented by pressurized area $B_1$ because gasket 25 can prevent such fluid communication) to apply additional downward force to valve element 33 for actuation. Hence, in the second stroke portion $H_2$ of the positioning element 1, only the pressurized surface represented by $B_3$ in FIG. 8 (or alternatively represented by A in FIG. 2) can be available to actuate the valve element 33. This is in contrast with the greater pressurized area, that is pressurized surfaces $B_3$ and $B_1$, that could actuate the valve element 33 when the gasket 29 was positioned within the first stroke portion $H_1$.

Because of the smaller pressurization surface $B_1$ available in the second stroke portion $H_2$ as compared to the greater pressurization surface $B_1+B_3$ available in the first stroke portion $H_1$, the user must apply a greater actuation force to move the valve element 33 to its open position in the second stroke portion $H_2$ than is necessary to move the valve element 33 to its open position in the first stroke portion $H_1$. Hence an inadvertent application of force to the positioning element 1 can be less likely to reinitiate extension of the positioning element 1 when the positioning element 1 has become stationary in the second stroke portion $H_2$.

The gasket 29 can be thought of as a second valve, opening and closing the flow connection or bypass 14. The second valve, i.e. gasket 29, can be moved to an open position during the $H_1$ portion of the extension stroke as a result of the enlarged circumferential diameter 51, and can be moved to a closed position during the $H_2$ portion of the extension stroke (as a result of contact of the gasket 29 with the reduced circumferential diameter 55). By closing the second valve, i.e. having the gasket 29 seal the bypass 14, a greater manual opening force can be required to restart or retrigger the extension stroke of the piston rod 5 than was necessary to initiate the extension stroke of the piston rod 5 from an initially closed or fully retracted position of the positioning element 1.

Once the dynamic pressure $p_2$ which has built up is sufficiently great, the valve element 33 with its sleeve-shaped extension 35, along with the gasket 29, can move out of the ring channel 37. The ring channel 37 can become steadily larger by means of the expanded cross section 39. Consequently, the pressurized area also can become larger, expanding from the area represented by A in FIG. 2, until the pressurized area preferably equals the circular ring-shaped area formed by the inside dimension of the cylinder and the cross section of the piston rod 5. Once the connecting openings 42 again can permit fluid communication between the upper working chamber 9 and the lower working chamber 11, the flow of blocking medium fluid can maintain the valve element 33 in its open position as previously described without need of additional user intervention.

In the insertion direction, beginning from the maximum extended position, the sleeve-shaped extension 35 can be moved into the ring channel 37, to which process the valve spring 43 can also make a contribution. The piston ring 23 can be displaced by the frictional force of the interior wall of the cylinder 3 toward the stop plate 17, so that the bypass 14 can be opened. The seal lip 49 of the second piston ring 47 can also be lifted up under the dynamic pressure in the lower working chamber 9. The connection between the two working chambers, chamber 9 and chamber 11, can be created so that the insertion movement of the piston rod 5 can be executed with the application of a relatively reasonable external force.

In other words, the second piston ring 47 can be thought of as a third valve to open and close a flow connection between the upper and lower working chambers 9 and 11. During the extraction stroke of the piston rod 5, blocking medium impinging on the lip seal 47 can maintain sealing contact of the seal lip 49 with the interior wall of the cylinder 3. During the insertion stroke of the piston rod 5, the seal lip 49 of the second piston ring 47 can lift up to form a flow connection between the two axial sides of the second piston ring 47.

The second valve, i.e., the piston ring 23, can also open in the insertion stroke to open bypass 14. When the piston ring 23 is adjacent the larger cross section area 51 corresponding to the first stroke portion $H_1$, the piston ring 23 and the interior wall of the cylinder 3 are not in contact (see FIG. 1). Hence the bypass 14 will remain open whenever the positioning element 1 is positioned in the first stroke portion $H_1$. However, when the piston ring 23 is adjacent the smaller cross section area 55 corresponding to the second stroke portion $H_2$, the piston ring 23 can sealingly contact the interior wall of the cylinder 3 (see FIG. 2) to close the bypass 14.

Figure 2A:
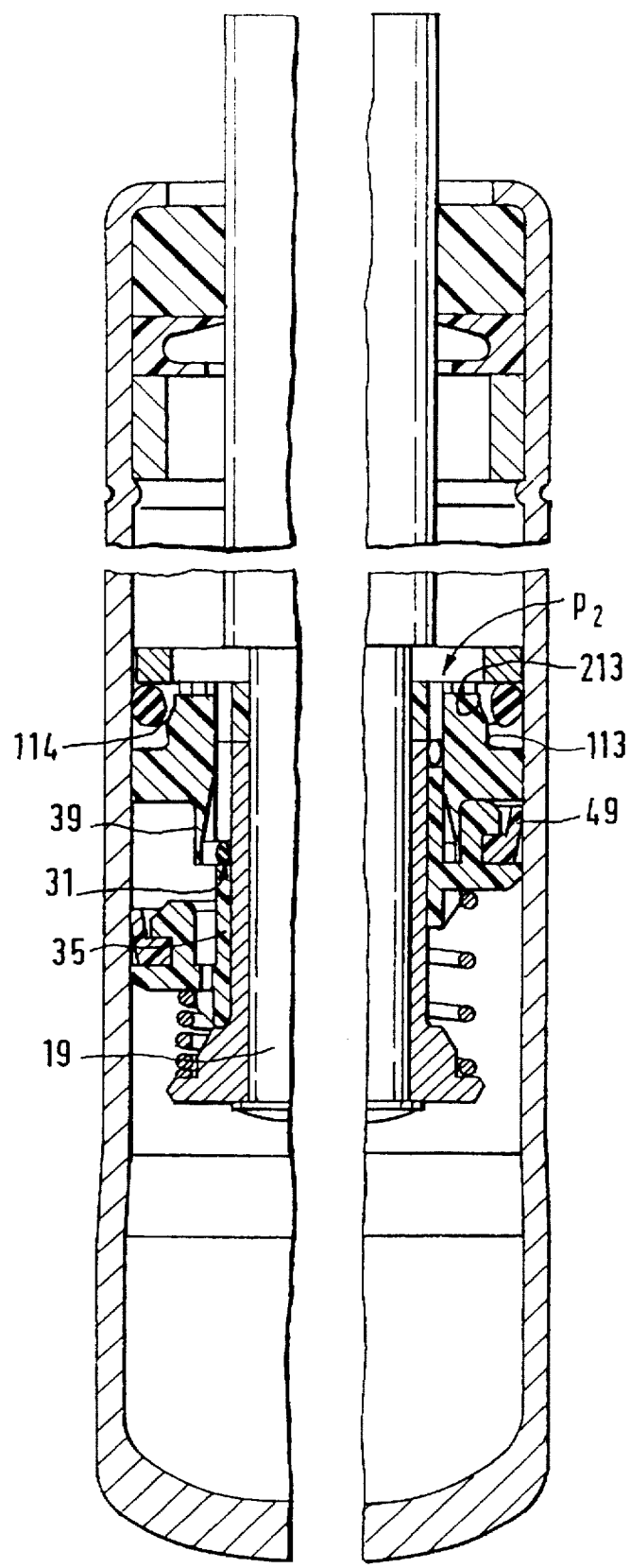
FIG. 2a illustrates a positioning mechanism in cross section.

As shown in FIG. 2a for a possible embodiment of the present invention, the piston ring 23 can move from a surface 113 to a surface 213 of the base body 13 in response to an insertion stroke of the positioning element 1. Friction between the piston ring 23 and the interior surface of the cylinder 3, when the positioning element 1 is positioned in the second stroke portion $H_2$, can displace the piston ring 23 from the surface 113. When the piston ring 23 is disposed against the surface 113, the piston ring 23 can be in sealing contact with the surface 113, or in a possible embodiment of the present invention, can be in sealing contact against the shoulder 25 (shown in FIG. 1), to close the bypass 14. Friction caused by the relative movement between the cylinder 3 and the of the base body 13 during an insertion stroke, can move the piston ring 23 to surface 213. Surface 213 can be formed with a smaller diameter than the diameter of surface 113, to allow a flow passage 114 to form between the piston ring 23 and the surface 213. Via flow passage 114, the bypass 14 can open. Upon an extension of the positioning element 1, relative movement between the cylinder 3 and the base body 13 can move the piston ring from surface 213 to surface 114 to close the bypass 14 during an extension of the positioning element 1.

FIGS. 3 and 4 show possible embodiments of the piston 7, each as an isolated part. The piston 7 illustrated in FIG. 3 is essentially the same as the piston 7 illustrated in FIGS. 1 and 2. On an embodiment as illustrated in FIG. 3, there can be the possibility that in the event of an external opening force which is applied extremely slowly, the dynamic pressure $p_1$ which can build up on the valve element 33 can be too low, because a pressure equalization between the lower working chamber 11 and the dynamic pressure chamber 53 can take place via the connecting openings 42. The consequence of this equalization can be a delayed release of the blocking action of the positioning element.

In the embodiment illustrated in FIG. 4, a flow channel 57 can be used, which flow channel 57 can be realized in series with the ring channel 37. When there is an opening movement, the dynamic pressure $p_1$ cannot escape by means of connecting openings, but can be contained until the ring channel 37 can be opened by the sleeve-shaped extension 35 (see the lower portion of FIG. 4). Therefore, the ring channel 37 can be connected via the expanded cross section 39 to the flow channel 57, so that the working chambers 9 and 11 can also be connected. A relatively protracted blocking can no longer occur.

If the positioning element is to be blocked, the sequence of movement of the individual parts of the piston 7 can essentially be substantially identical to that described for FIGS. 1 and 2. So that the insertion movement of the sleeve-shaped extension 35 of the valve element 33 is preferably not obstructed or prevented by a contained dynamic pressure, the valve element 33 can have a relatively very small ventilation opening 59 which can connect the dynamic pressure chamber 53 with the lower working chamber 11. This ventilation opening 59 can be made relatively extremely small, because the volume of blocking medium to be displaced can be relatively very small.

Figure 4A:
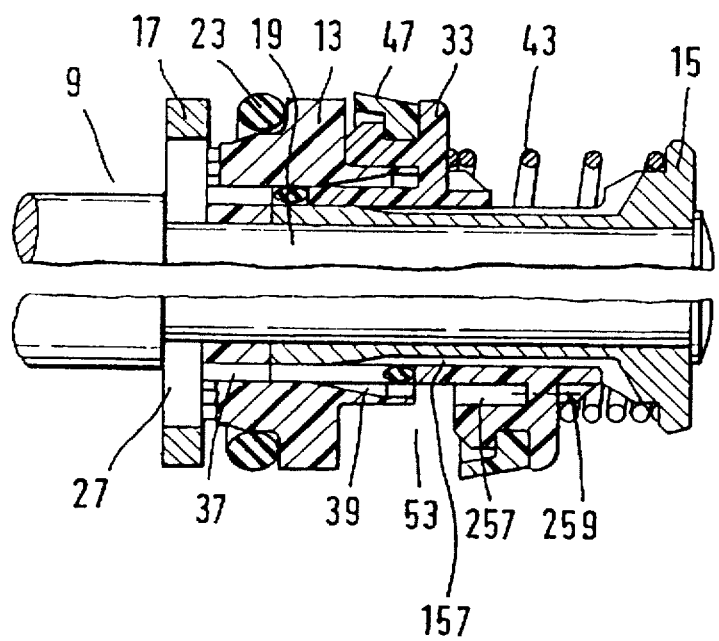
FIG. 4a shows the piston as an individual part.

FIG. 4a illustrates another possible embodiment of the piston 7, similar to the embodiment shown in FIG. 4. Rather than using connecting openings 42, the ring channel 37 can be connected to the lower working chamber 11 via a flow channel 157. The flow channel 157 can be connected in series with the ring channel 37 to connect the upper working chamber 9 and the lower working chamber 11. The flow channel 157 can be formed as one or more axial grooves extending along the exterior of the guide sleeve 15. In other possible embodiments of the present invention, the flow channel 157 can be formed from one or more axial grooves located along the interior of the valve element 33. A ventilation opening 259 can also be used to release the contained dynamic pressure within the dynamic pressure chamber 53 as the valve element 33 returns to its closed position. The ventilation opening 259 can extend axially through the valve element 33, or, depending on particular flow and pressure requirements of possible embodiments of the present invention, the ventilation opening 259 can be connected to a flow passage 257.

Figure 5:
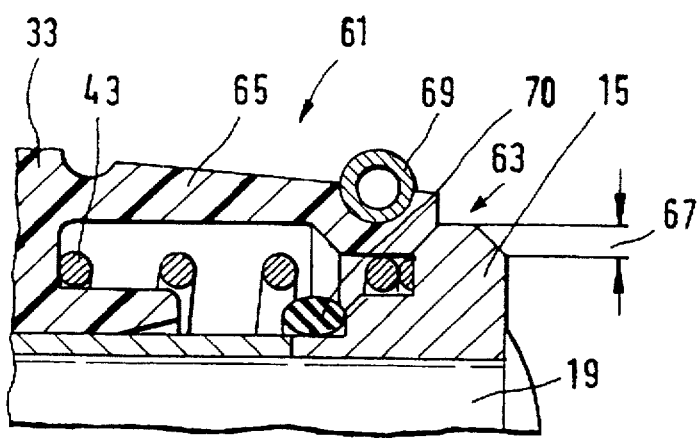
FIGS. 5, 6 and 7 show locking means on the piston for the valve element.
Figure 6:
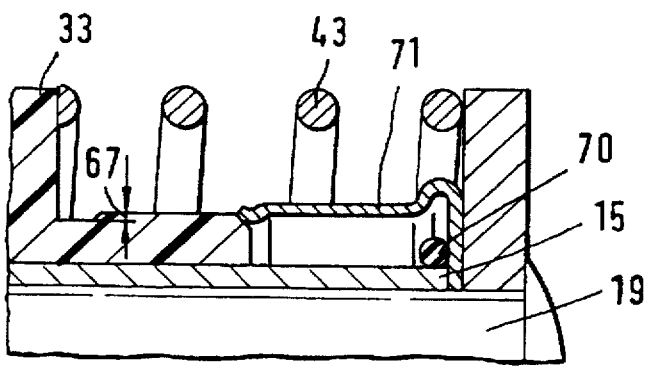
Figure 7:
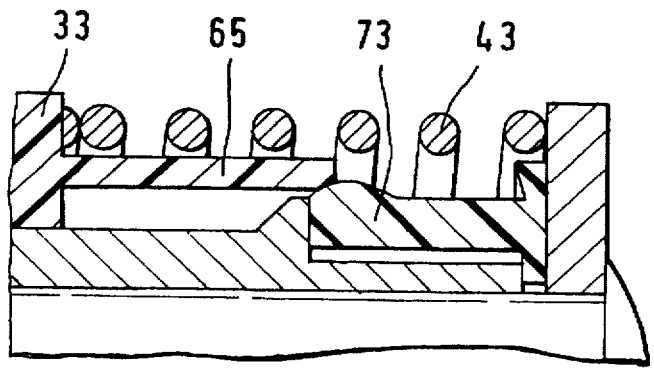

FIGS. 5 to 7 show locking means 61 which can be brought into engagement with matching locking means 63, to secure the open position of the valve element 33 illustrated in FIGS. 1 to 4, and FIGS. 8 and 4a. For this purpose, the matching locking means 63 can be stationary relative to the piston rod 5 and the piston rod stud 15.

In FIG. 5, the valve element 33 can have an extension 65, which extension 65 can be pushed over and locked onto a radial projection 67 of the guide sleeve 15. A radially acting spring 69 in the form of a hose or tube or bag spring supports the locking connection, while a damping element 70 advantageously prevents a hard engagement of the locking means.

A similar method is illustrated in FIG. 6. Below the guide sleeve 15, a snap spring 71 can be held in place and can interact with a radial projection 67 of the valve element 33. In FIGS. 5 and 6, positive or interlocking connections are preferably used on the locking means.

In FIG. 7, the extension 65 of the valve element 33 and an annular spring 73, e.g. in the form of a slotted sleeve, are preferably non-positively engaged with one another.

In all the embodiments, the valve spring force and the retaining force of the snap connection are preferably designed so that the retaining force of the snap connection, plus a relatively low dynamic pressure $p_1$; $p_2$ is greater than the closing force of the valve spring 43, so that once a valve element has opened, the valve element does not close immediately when there is a slight decrease in pressure. This effect has the advantage that the overall positioning element is no longer as sensitive to changing temperatures because the action of the snap connection is significantly less sensitive to temperature than the static pressure force of a pneumatic spring.

One feature of the invention resides broadly in the positioning or locking element to position or lock in position two objects which are movable in relation to one another, including a cylinder in which there is an axially movable piston rod with a piston, whereby the piston has a piston base body and divides the cylinder into two working chambers by means of a piston ring, a valve element which is movable relative to the piston base body and, depending on the position to which it has been switched, connects the two working chambers to one another, whereby the valve element has a smaller pressurization surface in its closed position than in its open position, characterized by the fact that the sealing action of the piston ring 23 in the extension direction is neutralized by means of a bypass 14 in a first portion of the stroke, that in the first portion 41 of the stroke the pressurization surface B of the valve element 33 is larger than in the following portion, that a dynamic or ram pressure p which is active in the opening direction of the valve element holds the valve element in the open position until, as a result of an external force, the extension movement of the piston rod 5 is stopped in any desired position, and a closing movement of the valve element is initiated, that starting from a hold position in the second portion $H_2$ of the stroke, the smaller pressurization surface A of the valve element 33, in connection with a second dynamic pressure $p_2$ effects an opening movement of the valve element and causes a bypass of the piston ring 23 and initiates a piston rod movement, that in the insertion direction, regardless of the stroke position, the sealing action of the piston ring 23 is neutralized.

Another feature of the invention resides broadly in the positioning element characterized by the fact that the piston ring 23 is realized so that it can move axially inside a ring groove 21, and depending on the direction of motion, opens or closes the bypass 14 by means of friction actuation.

Yet another feature of the invention resides broadly in the positioning element characterized by the fact that the cylinder 3 has a larger interior cross section surface 51 in the first portion $H_1$ of the stroke than in the second, whereby the valve element 33 has a second piston ring 47 which is realized so that it is radially flexible and compensates for the difference in diameter between the stroke portions $H_1$; $H_2$.

Still another feature of the invention resides broadly in the positioning element characterized by the fact that the second piston ring 47 has its sealing action neutralized in the insertion direction.

A further feature of the invention resides broadly in the positioning element characterized by the fact that the second piston ring 47 has an elastic sealing lip 49 which, depending on the direction of the incoming flow, expands or spreads radially.

Another feature of the invention resides broadly in the positioning element characterized by the fact that the valve element 33 has a sleeve-shaped extension 35, the end surface of which forms the smaller pressurization surface A.

Yet another feature of the invention resides broadly in the positioning element characterized by the fact that the smaller pressurization surface A of the valve element 33 is located inside the piston base body cross section.

Still another feature of the invention resides broadly in the positioning element characterized by the fact that a gasket 29 interacts with the smaller pressurization surface A, which gasket closes a ring channel 37 of the piston base body 13.

A further feature of the invention resides broadly in the positioning element characterized by the fact that the ring channel 37, starting from the closed position of the gasket 29 of the valve element 33, has an expanded cross section 39, so that the smaller pressurization surface A increases in size during an opening movement of the valve element in the vicinity of the expanded cross section.

Another feature of the invention resides broadly in the positioning element characterized by the fact that the expanded cross section is formed by angular or diagonal or oblique grooves.

Yet another feature of the invention resides broadly in the positioning element characterized by the fact that the expanded cross section is formed by a funnel-shaped expanded diameter.

Still another feature of the invention resides broadly in the positioning element characterized by the fact that the valve element 33 has connection openings which make possible an overflow between the two working chambers 9; 11.

A further feature of the invention resides broadly in the positioning element characterized by the fact that the valve element 33 interacts with a flow channel 57, whereby the flow channel, regardless of the opening cross section of the ring channel 37, makes possible a connection between the two working chambers 9; 11 as a function of the valve position of the valve element 33.

Another feature of the invention resides broadly in the positioning element characterized by the fact that the valve element 33 has a ventilation opening 59 to a dynamic pressure chamber 53 which begins at the gasket 29 in the ring chamber 37.

Yet another feature of the invention resides broadly in the positioning element characterized by the fact that the valve element 33 is biased in the closing direction by a valve spring 43.

Still another feature of the invention resides broadly in the positioning element characterized by the fact that the valve element 33 has locking means 61 which, in the opening position of the valve element, interact with matching locking means 63 which are fastened so that they are stationary relative to the piston rod 5.

A further feature of the invention resides broadly in the positioning element characterized by the fact that the valve element 33 has an extension 65 which represents the locking means 61 and interacts in a positive or interlocking manner with the matching locking means 63.

Another feature of the invention resides broadly in the positioning element characterized by the fact that the action of the locking means 61 is reinforced by a radially acting spring 69.

Yet another feature of the invention resides broadly in the positioning element characterized by the fact that the valve element 33 interacts non-positively with a retaining part 73 which is stationary relative to the piston rod 5.

Still another feature of the invention resides broadly in the positioning element characterized by the fact that during an extension movement of the piston rod 5, the force of the current dynamic pressure on one of the two pressurization surfaces A; B in connection with the retaining force of the locking connection 61; 63 is greater than the closing force of the valve spring 43.

Examples of gas springs or pneumatic springs which could possibly be used or which could possibly be adapted for use in the context of the present invention could be disclosed by the following U.S. Patent and U.S. Patent Applications, all of which are assigned to the assignee of the present invention: U.S. Pat. No. 5,560,456, U.S. patent application Ser. No. 08/719,550, U.S. patent application Ser. No. 08/759,320 and U.S. patent application Ser. No. 08/777,703 filed Dec. 20, 1996 titled "A Pneumatic Strut for a Motor Vehicle With an Adjustable Limit Position" having inventors Hans-Josef Hosan, Castor Fuhrmann and Hans-Klaus Schnitzius and Attorney Docket No. NHL-FIS-249 (STAB) and claiming priority from Federal Republic of Germany Patent Application No. 195 48 139.9 filed Dec. 21, 1995.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A strut for a motor vehicle for permitting moving and positioning and holding of one movable object with respect to another object, said strut comprising:

a cylinder having a longitudinal axis;

said cylinder comprising a first axial end and a second axial end;

means for connecting said cylinder to the one object;

a piston rod having a first end and a second end;

said first end of said piston rod being disposed within said cylinder;

said second end of said piston rod extending out of said first end of said cylinder;

means for connecting said second end of said piston rod to the another object;

a piston being disposed within said cylinder;

said piston being connected to said first end of said piston rod;

said piston being disposed to divide said cylinder into first and second chamber portions;

working fluid being disposed within said first and second chamber portions;

a flow passage extending between said first chamber portion and said second chamber portion;

said piston comprising a valve structure for opening and closing said flow passage between said first and second chamber portions;

said valve structure of said piston comprising a first valve portion and a second valve portion;

said first valve portion being disposed to be movable with respect to said second valve portion;

said second valve portion comprising a portion of said flow passage;

said portion of said flow passage being disposed within said second valve portion;

said first valve portion comprising a cylindrical portion configured to be disposed in said portion of said flow passage within said second valve portion to close said flow passage;

said cylindrical portion of said first valve portion being disposed to be movable in a first direction from said portion of said flow passage within said second valve portion to open said flow passage;

said cylindrical portion of said first valve portion being disposed to be movable in a second direction toward said portion of said flow passage within said second valve portion to close said flow passage;

said piston and said piston rod being disposed to be axially movable with respect to said cylinder to extend and retract said strut;

said strut being extendable from a first position to a second position;

said strut being further extendable from the second position to a third position;

said strut comprising structure to permit said strut to selectively maintain a stationary position between the first position and the third position to hold an object and another object stationary with respect to one another;

said cylinder comprising a first portion and a second portion;

said piston being disposed within said first portion of said cylinder during an extension of said strut from the first position to the second position;

said piston being disposed within said second portion of said cylinder during an extension of said strut from the second position to the third position;

means for actuating said first valve portion to initiate movement of said cylindrical portion of said first valve portion in said first direction to open said flow passage;

said means for actuating said first valve portion comprising a first surface upon said piston being disposed within said first portion of said cylinder;

said first surface being disposed on said first valve portion;

said first surface being disposed to transfer a force from said working fluid to said first valve portion;

said first surface having a first cross section component;

said first cross section component being disposed to accept a force substantially parallel to the longitudinal axis;

said means for actuating said first valve portion comprising a second surface upon said piston being disposed within said second portion of said cylinder;

said second surface being disposed substantially solely on said cylindrical portion of said first valve portion;

said second surface being disposed to transfer a force from said working fluid to said first valve portion;

said second surface having a second cross section component;

said second cross section component being disposed to accept a force substantially parallel to the longitudinal axis;

said first cross section component of said first surface is greater than said second cross section component of said second surface;

said means for actuating said first valve portion being configured to hold said cylindrical portion of said first valve portion away from said portion of said flow passage in said second valve portion to keep said flow passage open until movement of said piston rod is stopped by an external force; and said means for actuating said first valve portion being configured to permit said cylindrical portion of said first valve portion to move towards said portion of said flow passage in said second valve portion to close said flow passage upon movement of said piston rod being stopped by an external force.

2. The strut according to claim 1, wherein:

said first surface of said means for actuating comprises a first portion and a second portion; and said second surface of said means for actuating comprises said second portion of said first surface of said means for actuating.

3. The strut according to claim 2, wherein:

said cylinder comprises an interior surface defining a portion of each of said first and second chamber portions of said cylinder;

said second valve portion of said valve structure is axially fixed to said piston rod;

said second valve portion of said valve structure comprises a body;

said body of said second valve portion is disposed substantially concentrically about the longitudinal axis;

said body of said second valve portion comprises a first end and an axially opposite second end;

said first end of said body is disposed adjacent said first chamber portion;

said body of said second valve portion comprises at least one internal passage;

said at least one internal passage of said body extends between said first and second ends of said body;

said flow passage comprises said at least one internal passage of said body;

said body of said second valve portion comprises a surface disposed adjacent the interior surface of said cylinder;

said interior surface of said cylinder and said surface of said body are disposed to form an annular gap about said body;

said annular gap about said body comprises a bypass channel fluidly connecting said first and second ends of said body;

said first portion of said first surface of said means for actuating is disposed to transfer a force from working fluid disposed in said bypass channel; and said second portion of said first surface of said means for actuating is disposed to transfer a force from working fluid disposed in said at least one internal passage of said body.

4. The strut according to claim 3, wherein:

said means for actuating comprises means for closing said bypass channel upon said piston being disposed in said second portion of said cylinder;

said means for closing said bypass channel upon said piston being disposed in said second portion of said cylinder comprises a piston ring;

said piston ring is disposed about said body of said second valve portion;

said piston ring and said interior surface of said cylinder are disposed to form a passage between said piston ring and said interior surface of said cylinder upon said piston being disposed in said first chamber portion of said cylinder; and said piston ring is disposed to sealingly contact said interior surface of said cylinder upon said piston being disposed in said second chamber portion of said cylinder.

5. The strut according to claim 4, wherein:

said strut comprises working fluid disposed to flow between said first and second chambers during an extension of said strut;

said first valve portion is movable to a first position to open said first flow passage to extend said strut;

said valve structure comprises holding structure to permit said first valve portion to remain in said first position of said first valve portion during an extension of said strut;

said holding structure to maintain said first valve portion in said first position comprises a third surface;

said third surface of said holding structure is disposed to accept a force from said working fluid and transfer a force to said first valve portion;

said third surface of said holding structure is disposed to accept a force from working fluid flowing between said first and second chamber portions;

said third surface of said holding structure comprises a third cross section area;

said third cross section area is disposed to accept a force substantially parallel with the longitudinal axis; and said third cross section area is greater than said first cross section area.

6. The strut according to claim 5, wherein said third surface of said holding structure comprises said first surface of said means for actuating.

7. The strut according to claim 6, wherein:

said first valve portion is movable to a second position to close said flow passage; and said structure to permit said strut to selectively maintain a stationary position comprises structure to move said first valve portion to said second position upon cessation of flow of working fluid between said first and second working chambers.

8. The strut according to claim 7, wherein said strut comprises means for opening said bypass channel during an insertion stroke of said strut upon said piston being disposed in said second portion of said cylinder.

9. The strut according to claim 8, wherein:

said piston ring is a first piston ring;

said interior surface of said cylinder comprises a first portion and a second portion;

said piston ring is disposed adjacent said first portion of said interior surface upon said piston being disposed in said first portion of said cylinder;

said piston ring is disposed adjacent said second portion of said interior surface upon said piston being disposed in said second portion of said cylinder;

said first portion of said interior surface defines a first cross section area of said cylinder;

said second portion of said interior surface defines a second cross section area of said cylinder, the second cross section area being less than the first cross section area;

said valve structure comprises a second piston ring;

said second piston ring is sealingly attached to said first valve portion;

said second piston ring is disposed in sealing contact with said interior surface of said cylinder; and said second piston ring is radially deformable to compensate for the changes in cross section area of said cylinder.

10. The strut according to claim 9, wherein:

said means for opening said bypass comprises a first portion of said body;

said means for closing said bypass comprises a second portion of said body;

said first portion of said body is coaxial with said second portion of said body;

said first piston ring is disposed to be movable from said first portion of said body to said second portion of said body in response to an extension of said strut upon said piston being disposed in said second chamber portion of said cylinder;

said first piston ring is disposed to be movable from said second portion of said body to said first portion of said body in response to a retraction of said strut upon said piston being disposed in said second chamber portion of said cylinder;

said first piston ring and said first portion of said body are disposed to form a flow connection between said first piston ring and said first portion of said body upon said first piston ring being disposed about said second portion of said body; and said first piston ring is disposed to sealingly contact said second portion of said body upon said first piston ring being disposed about said second portion of said body.

11. The strut according to claim 10, wherein:

said bypass channel is a first bypass channel;

said first portion of said valve structure comprises a valve element;

said valve element is disposed coaxially with said body of said second valve portion;

said valve element is disposed between said body of said second valve portion and said second chamber portion of said cylinder;

said valve element is disposed to be movable away from said body along the longitudinal axis to open said flow passage;

said valve element is disposed to be movable towards said body along the longitudinal axis to close said flow passage;

said valve element is disposed to be movable to a first position to open said flow passage;

said valve element is disposed to be movable to a second position to close said flow passage;

said valve element being movable away from said body represents said first direction of movement of said first valve portion;

said valve element being movable towards said body represents said second direction of movement of said first valve portion;

said first position of said valve element represents said first position of said first valve portion;

said second position of said valve element represents said second position of said first valve portion;

said valve element comprises a first end and an axially opposite second end;

said first end of said valve element is disposed adjacent said body of said second valve portion;

said flow passage comprises at least one channel;

at least a portion of said valve element is disposed about said at least one internal channel;

said at least one internal channel fluidly connects said first and second ends of said valve element;

said flow passage comprises said at least one internal channel;

said valve element and said interior surface of said cylinder are disposed to define an annular space about said valve element;

said annular space about said valve element forms a second bypass channel fluidly connecting said first and second ends of said valve element;

said second piston ring is attached to said valve element;

said second piston ring is resiliently deformable between a first sealing shape and a second sealing shape;

said second piston ring, in said first sealing shape, sealingly contacts said interior surface of said first portion of said cylinder upon said second piston ring being disposed adjacent said first portion of said interior surface of said cylinder;

said second piston ring, in said second sealing shape, sealingly contacts said second portion of said interior surface of said cylinder upon said second piston ring being disposed adjacent said second portion of said interior surface of said cylinder;

said second piston ring comprises a lip portion extending between said valve element and said interior surface of said cylinder;

said first surface portion of said first surface of said means for actuating comprises a surface of said lip portion; and said lip portion is elastically deformable to open said second bypass channel in response to an insertion stroke of said strut.

12. The strut according to claim 11, wherein:

said valve element comprises a tubular extension;

said tubular extension of said valve element is coaxial with respect to the remainder of said valve element;

said tubular extension of said valve element extends from the remainder of said valve element towards said first chamber portion of said cylinder;

said tubular extension of said first valve portion comprises an end surface disposed axially opposite the remainder of said valve element;

said second surface of said means for actuating comprises said end surface of said tubular extension; and said end surface of said tubular extension is disposed within said body portion of said second valve portion upon said valve element being disposed in the second position of said valve element.

13. The strut according to claim 12, wherein:

said at least one internal passage of said body of said second valve portion comprises an annular passage;

said annular passage is substantially concentric about the longitudinal axis;

said end surface of said tubular extension is disposed within said annular passage upon said valve element being disposed in said second position of said valve element;

at least a portion of said tubular extension of said valve element is slidingly disposed within said annular passage during at least a portion of movement of said valve element between the first and second positions of said valve element;

said means for actuating comprises a gasket;

said gasket is disposed within said annular channel;

said gasket is disposed against said end surface of said tubular extension;

said gasket is disposed to transfer a force between said working fluid and said end surface of said tubular extension;

said gasket is axially displaceable within said annular chamber in response to axial movement of said tubular extension of said valve element; and said gasket is axially movable to open and close said flow passage.

14. The strut according to claim 13, wherein:

said annular channel of said body comprises a first portion and a second portion;

said first portion of said annular channel is disposed adjacent said first end of said body;

said second portion of said annular channel is disposed adjacent said second end of said body;

said first portion of said annular channel has a cross section area;

said gasket is sealingly disposed within said first portion of said annular chamber upon said valve element being disposed in the second position of said valve element;

said gasket is disposed within said second portion of said annular channel upon said valve element being disposed in the first position of the valve element;

said second portion of said annular channel comprises a first end and an axially opposite second end;

said first end of said second portion of said annular channel is disposed adjacent said first portion of said annular channel;

said first end of said second portion of said annular channel has a first cross section area;

said second end of said second portion of said annular channel has a second cross section area;

said second portion of said annular channel comprises an intermediate portion;

said intermediate portion of said second portion of said annular channel is disposed between said first and second ends of said second portion of said annular channel;

said intermediate portion of said second portion defines a plane substantially perpendicular to the longitudinal axis;

said intermediate portion of said second portion comprises a third cross section area;

the third cross section area of said intermediate portion is greater than the first cross section area of said first end of said second portion of said annular channel; and the third cross section area of said intermediate portion is less than the second cross section area of said second end of said second portion of said annular channel to vary the cross section area of said second portion of said annular channel along the longitudinal axis.

15. The strut according to claim 14, wherein:

said body comprises a third portion;

said third portion of said body is disposed to define an outer surface of of said second portion of said annular channel;

said third portion of said body comprises at least one of the following A) and B):

A) at least one groove;
said at least one groove is disposed to extend radially outward from said second portion of said annular channel; and
said at least one groove is disposed at an oblique angle with respect to the longitudinal axis; and B) said third portion of said body comprises a substantially conical-shape along the longitudinal axis.

16. The strut according to claim 15, wherein:

said valve structure of said piston comprises one of the following C) and D):

C) said at least one internal channel of said flow passage comprises at least one internal bore disposed in said valve element; and
said at least one internal bore extends between said first and second ends of said valve element; and D) said second valve portion comprises a guide sleeve;
said guide sleeve is disposed substantially concentrically about the longitudinal axis;

said guide sleeve extends from said body towards said second chamber portion of said cylinder;

said valve element is slidingly disposed about said guide sleeve;

said at one internal channel of said flow passage comprises at least one groove formed between said valve element and said guide sleeve;

said at least one groove extends axially between said first and second ends of said valve element;

said valve element comprises at least one ventilation opening;

said at least one ventilation opening connects said first and second ends of said valve element; and said at least one ventilation opening is disposed to permit draining of working fluid disposed between said valve element and said body upon movement of said valve element in the second direction.

17. The strut according to claim 16, wherein:

said structure to move said first valve portion to said second position upon cessation of flow of working fluid comprises a spring; and said spring is disposed to apply a force to said valve element to urge said valve element towards said body.

18. The strut according to claim 17, wherein:

said holding structure to permit said first valve portion to remain in said first position of said first valve portion further comprises:

first locking means for retaining said valve element in in the first position of said valve element;

said first locking means comprises a first locking portion of said valve element;

second locking means for retaining said valve element in the first position of said valve element;

said second locking means comprises a second locking portion of said second valve portion;

said first and second locking portions are disposed to cooperatively engage one another upon said valve element being disposed in the first position of said valve element; and said first and second locking portions are disposed to resist a force directed to move said valve element in the second direction of movement of said valve element upon engagement of said first and second locking portions.

19. The strut according to claim 18, wherein:

said first and second locking means comprises one of the following E), F) and G);

E) said first locking portion of said valve element comprises a cylindrical extension of said valve element;

said cylindrical extension of said valve element is disposed substantially concentrically about the longitudinal axis;

said cylindrical extension of said valve element extends from the remainder of said valve element towards said second chamber portion of said cylinder;

said cylindrical extension of said valve element comprises a first portion and a coaxial second portion;

said first portion of said cylindrical extension is disposed adjacent the remainder of said valve element;

said first portion of said cylindrical extension comprises a surface disposed a first radial distance from the longitudinal axis;

said second portion of said cylindrical extension comprises a surface disposed a second radial distance from the longitudinal axis;

said second locking portion of said second valve portion comprises a locking element;

said locking element of said second valve portion is attached to said piston rod between said valve element and said second chamber portion of said cylinder; and at least a portion of said locking element is disposed adjacent said surface of said first portion of said cylindrical extension upon said valve element being disposed in the first position of said valve element; and F) said first locking portion of said valve element comprises a cylindrical extension of said valve element;

said cylindrical extension of said valve element extends from the remainder of said valve element towards said second chamber portion of said cylinder;

said cylindrical extension of said valve element is disposed substantially concentrically about the longitudinal axis;

said cylindrical extension of said valve element has an inside diameter;

said second locking portion of said second valve portion comprises a retaining element;

said retaining element of said second valve portion is attached to said piston rod between said valve element and said second chamber portion of said cylinder;

said retaining element comprises a cylindrical portion disposed substantially concentrically about the longitudinal axis;

said cylindrical portion of said retaining element has an outside diameter; and said outside diameter of said retaining element is greater than the inside diameter of said cylindrical extension of said valve element to permit interference between said cylindrical extension of said valve element and said cylindrical portion of said retaining element; and G) said first locking means comprises an additional spring;

said additional spring is disposed about said locking portion of said valve element; and said additional spring is disposed to urge said first and second locking portions to remain engaged with one another upon engagement of said first and second locking portions.

20. The strut according to claim 19, wherein the force applied by said spring is less than the sum of the force transmitted to said valve element by said third surface of said holding structure and the force necessary to disengage said first and second locking portions during an extension of said strut.

* * * * *